Inventor
J. Buchli,
By Marks & Clerk
Attys.

Patented Sept. 1, 1925.

1,551,975

UNITED STATES PATENT OFFICE.

JACOB BUCHLI, OF BADEN, SWITZERLAND, ASSIGNOR TO AKTIENGESELLSCHAFT BROWN, BOVERI AND CIE., OF BADEN, SWITZERLAND.

DRIVING MECHANISM OF ELECTRIC LOCOMOTIVES.

Application filed February 14, 1923. Serial No. 619,005.

*To all whom it may concern:*

Be it known that I, JACOB BUCHLI, a citizen of the Swiss Republic, residing at No. 2 Felsenstrasse, Baden, Switzerland, have made certain new and useful Improvements in the Driving Mechanism of Electric Locomotives, of which the following is a specification.

This invention has for its object to provide an improved driving mechanism for electric locomotives.

In this improved driving mechanism the electric motor is rigidly fixed on the main framing of the locomotive, and it drives, through a universal coupling, a driving wheel axle which is mounted in a bogie.

This improved arrangement has the advantage that the main framing (which is already necessarily very strong) can be utilized for carrying the heavy electric motor, whilst the bogie may be made comparatively light.

An embodiment of the invention is illustrated by way of example in the accompanying drawings in which:—

Figure 1:
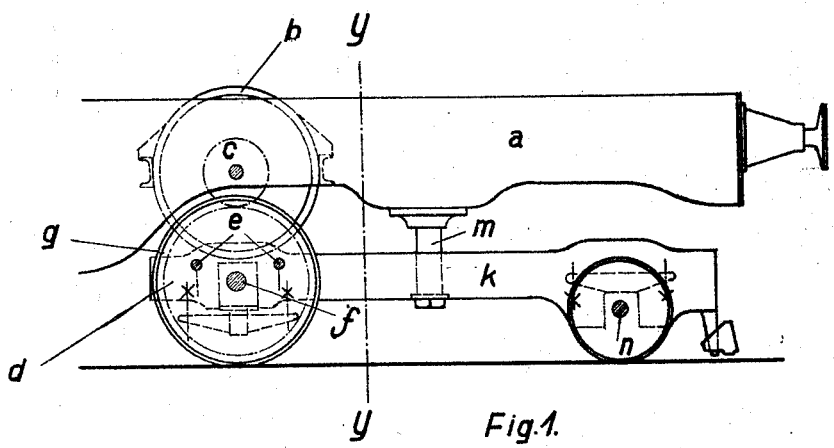
Figure 2:
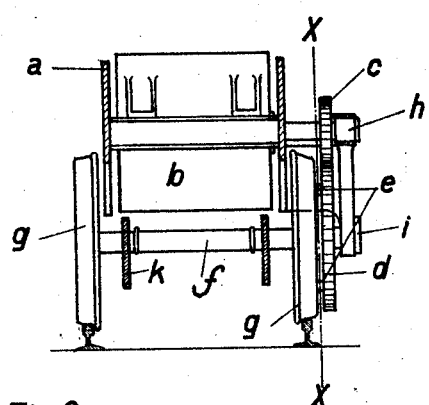

Figure 1 is a side elevation of the locomotive, from which the toothed wheel gear has been removed by a section taken along the line X—X of Figure 2, and Figure 2 is a vertical cross-section taken along the line Y—Y of Figure 1.

In the illustrated example, $a$ is the main framing of the locomotive in which the electric motor $b$ is rigidly fixed. This motor drives, through the gear consisting of a pinion $c$ and a toothed wheel $d$ and through the universal coupling $e$, the driving axle $f$ with its two driving wheels $g$.

The bearings $h$ and $i$ of the gear wheels $c$ and $d$ are rigidly fixed to the main framing $a$.

The driving axle $f$ is mounted in bearings in the bogie $k$ which is capable of swivelling around the pin $m$ of the main framing and which is further supported by the free-running wheel axle $n$. The universal coupling $e$ is constructed to take up the play of the springs between the driving wheels $g$ and the main framing $a$, and also the obliquity of the bogie $k$ relatively to the main framing $a$.

It is possible to use any coupling for connecting the driving wheel $g$ to the toothed wheel $d$ providing that it is really movable in all directions, that is, one which allows of:

1. A longitudinal displacement of the axles;
2. A parallel displacement of the axles, and
3. An angular setting of the axles.

As an example of such a coupling see my Patent No. 1,298,881, granted April 1, 1919.

What I claim is:—

1. In a driving mechanism for electrical bogie-locomotives, the combination with the main framing of the locomotive and the locomotive-bogie, of a driving motor rigidly fixed to said main frame, a driving wheel axle in said bogie, and a universal coupling for transmitting the driving effort from said driving motor to said driving wheel axle in said bogie the axle of said driving motor being substantially parallel to the driving wheel axle and to the main axes of the universal coupling.

2. In a driving mechanism for electrical bogie-locomotives, the combination with the main framing of the locomotive, and the locomotive-bogie, of a driving motor rigidly fixed to said main frame, a driving wheel axle in said bogie, and a universal coupling for transmitting the driving effort from said driving motor to said driving wheel axle in said bogie, a single toothed wheel transmission gear receiving the driving effort from said driving motor and transmitting same to said universal coupling, said toothed wheel gear being located outside said driving wheel, and an arm extending from said main framing, comprising bearings for the toothed wheels of said gear.

3. In a driving mechanism for electrical bogie-locomotives, the combination with the main framing of the locomotive and the locomotive-bogie, of a driving motor rigidly fixed to said main frame, a driving wheel axle in said bogie, and a universal coupling located between a large toothed wheel meshing with a smaller toothed wheel on said motor shaft and said driving wheel for transmitting the driving effort from said driving motor to said driving wheel axle in said bogie.

4. In a driving mechanism for electrical bogie-locomotives, the combination with the main framing of the locomotive and the locomotive-bogie, of a driving motor rigidly fixed to said main frame, a driving wheel axle in said bogie, a free-running wheel axle in said bogie the axle of said driving for transmitting the driving effort from said driving motor to said driving wheel axle in said bogie. the axle of said driving motor being substantially parallel to the driving wheel axle and to the main axes of the universal coupling.

In testimony whereof I have signed my name to this specification.

JACOB BUCHLI.